No. 763,016. Patented June 21, 1904.

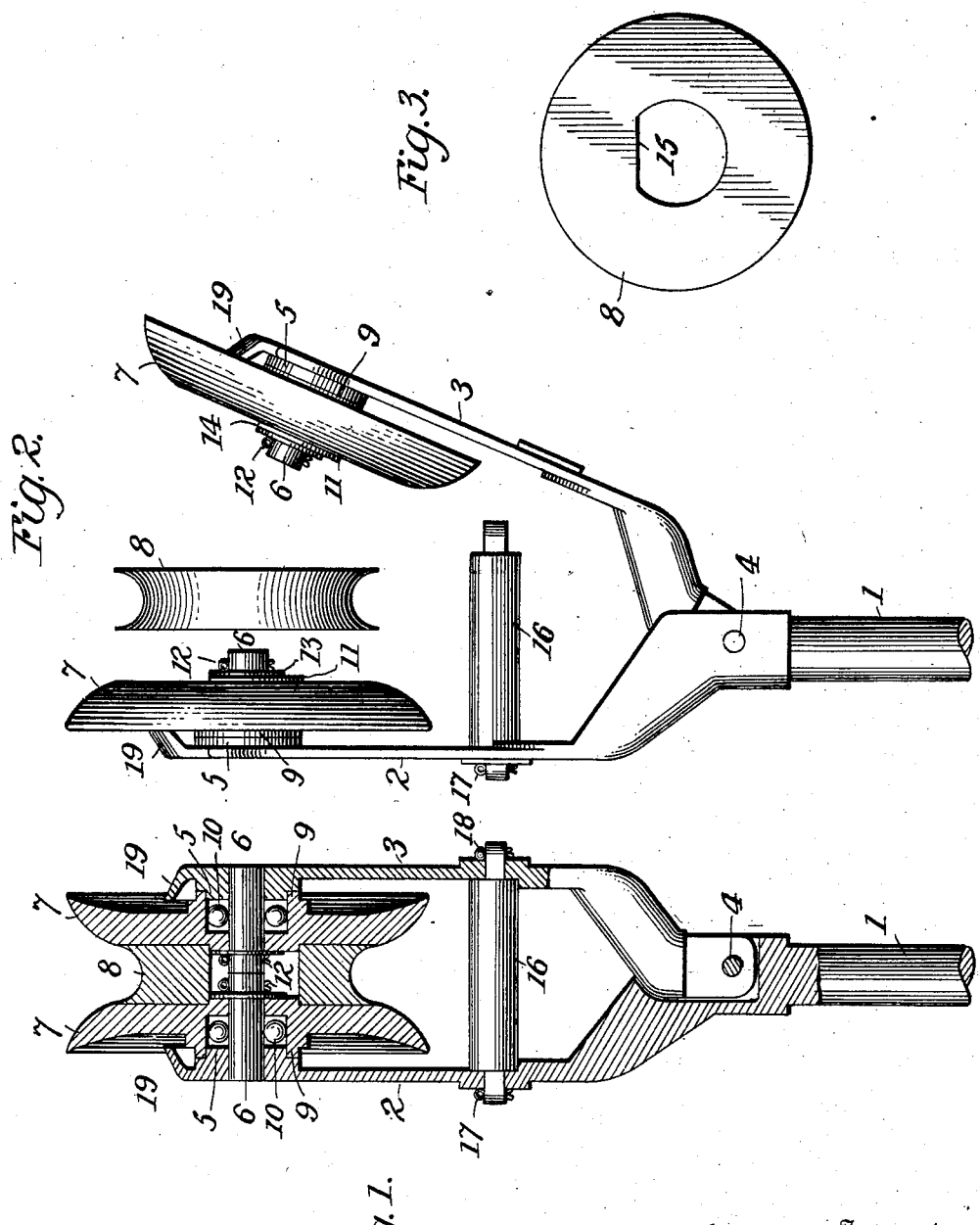

UNITED STATES PATENT OFFICE.

JAMES A. NORTON, OF WILKESBARRE, PENNSYLVANIA, ASSIGNOR OF ONE-HALF TO W. L. RAEDER, OF WILKESBARRE, PENNSYLVANIA.

BALL-BEARING TROLLEY-WHEEL.

SPECIFICATION forming part of Letters Patent No. 763,016, dated June 21, 1904.

Application filed October 22, 1903. Serial No. 178,119. (No model.)

*To all whom it may concern:*

Be it known that I, JAMES A. NORTON, a citizen of the United States, residing at Wilkesbarre, in the county of Luzerne, State of Pennsylvania, have invented certain new and useful Improvements in Ball-Bearing Trolley-Wheels, of which the following is a specification.

This invention relates to improvements in trolleys, and has for its object to provide a trolley in which the portion or section of the wheel subject to wear by use may be readily removed and replaced, if desired.

A further object of the invention is to provide a very light-running trolley, bearings of which are protected from dust and dirt and can be readily inspected, as may be necessary.

With this and other ends in view the invention consists in the construction and arrangement of parts that will be hereinafter described and claimed.

The invention is illustrated in the accompanying drawings, in which—

Figure 1 is a vertical sectional view through a trolley constructed in accordance with the present invention, the arms of the harp being shown in their normal closed position. Fig. 2 is a similar view, the swinging arm of the harp being shown in position to permit removal of the middle section of the wheel. Fig. 3 is a detail view of said middle wheel-section.

Referring to the drawings, in which like numerals of reference designate corresponding parts, 1 designates the trolley-pole, which is provided at its outer end with a harp consisting of a relatively stationary arm 2 and a laterally-swinging arm 3, which is adapted to be turned about an axis or pivotal connection 4. On the inner face of each arm of the harp is formed a boss 5, from which projects a short stud or pin 6, by which the trolley-wheel is supported. This wheel consists of two similarly-formed side or flange members 7 and an intermediate, middle, or body section 8, which is adapted to connect said flange members when the arms of the harp are in their normal positions. (Shown in Fig. 1.) Each of the flange-sections is provided on its outer concaved face with a central boss 9, which surrounds the boss 5 on the adjacent arm of the harp and provides an annular channel or groove, in which are arranged a series of anti-friction-balls 10. The pin or stud 6 is of such length as to extend through the adjacent flange member 7 and to project slightly beyond the inner face of an inwardly-projecting boss 11 on said wheel member. The flange member may be held in the above-described position relative to the arm of the harp by any suitable fastening means. In the embodiment of the invention herein illustrated a cotter-pin 12 is employed, a washer 13 being arranged between said pin and boss 11 on the wheel-flange.

The removable middle wheel-section 8 is made tubular and provided with a suitable peripheral groove. It is adapted to engage the bosses 11 on the flange members 7 when the arms of the harp are in the position shown in Fig. 1 and to connect said flange members, so that they will rotate together about their respective bearings on the arms of the harp. As shown in Figs. 2 and 3, a portion of each boss 11 is cut away to provide a flat face or surface 14, and a corresponding surface 15 is provided within the bore or passage in the wheel-section 8. By reason of the engagement between said flat sections 14 15 it will be seen that rotation of the wheel-section 8 relative to the flange members 7 is prevented.

The arms of the harp are connected by a cross-piece 16, the ends of which, as shown, project beyond the outer faces of the arms of the harp, and cotter pins or keys 17 18 are passed through said projecting ends. By withdrawing the locking-pin 18 the movable harp-arm may be swung into the position shown in Fig. 2, and then the body-section 8 of the wheel can be readily removed and replaced, if desired.

It will be noticed that each arm of the harp is provided at its upper end with an inwardly-extending flange or guard 19. This flange extends over the bosses 5 9 and prevents the trolley-wire from passing between the wheel and the harp should the wheel become detached from the wire.

Having thus described the invention and without intending to limit myself to the exact details of the embodiment thereof herein illustrated and described, what I claim, and desire to secure by Letters Patent, is—

1. In a trolley, the combination with a harp, of a separable wheel having a flange rotatably mounted on each arm of the harp and a removable middle section connecting said flanges.

2. In a trolley, the combination with a harp provided with a swinging arm, of a separable wheel having one flange rotatably mounted on the inner face of the relatively stationary arm of the harp, a second flange mounted on the inner face of swinging arm of the harp, and a body-section adapted to detachably connect said flanges when the arms of the harp are in normal position.

3. In a trolley, the combination with a harp having a laterally-swinging arm, of a separable wheel having a member rotatably mounted on the inner face of each of the arms of the harp, and means connecting said wheel members when the arms of the harp are in normal position.

4. In a trolley, the combination with a harp provided with a laterally-swinging arm, of a separable wheel having a flange member rotatably mounted on each of the arms of the harp and an intermediate section adapted to connect said flange members when the arms of the harp are in normal position, and means for holding said arms in such normal position.

5. In a trolley, the combination of a harp, having a swinging arm, both arms of the harp being provided with an inwardly-projecting stud, a wheel-flange rotatably mounted on each of said studs, a series of antifriction-balls between said studs and wheel-flanges, means for connecting the said flanges when the arms of the harp are in normal position, and means for retaining said arms in that position.

6. In a trolley, the combination of a harp, a separable wheel mounted in said harp and consisting of two flange members each rotatably mounted on the adjacent arm of the harp and an intermediate removable section provided at its sides with means for engaging coacting parts on the flange members, whereby said flanges are connected and adapted to rotate together.

In testimony whereof I have signed my name to this specification in the presence of two subscribing witnesses.

JAMES A. NORTON.

Witnesses:
W. C. OLDS,
CONRAD JACOB.